United States Patent [19]
Crockett

[11] Patent Number: 6,061,231
[45] Date of Patent: May 9, 2000

[54] COMPUTER DISPLAY ASSEMBLY

[75] Inventor: Robert J. Crockett, Central, S.C.

[73] Assignee: NCR Corporation, Dayton, Ohio

[21] Appl. No.: 08/115,299

[22] Filed: Sep. 1, 1993

[51] Int. Cl.[7] .................................................. G06F 1/16
[52] U.S. Cl. ........................................ 361/681; 345/905
[58] Field of Search ..................... 345/905, 30; 361/681;
248/917; 364/708

[56] References Cited

U.S. PATENT DOCUMENTS

| | | | |
|---|---|---|---|
| 4,241,380 | 12/1980 | Lehmann | 361/383 |
| 4,730,364 | 3/1988 | Tat-Kee | 16/337 |
| 4,958,889 | 9/1990 | Boyle et al. | 312/208 |
| 4,979,636 | 12/1990 | Daly | 220/324 |
| 5,164,542 | 11/1992 | Hart | 174/35 MS |
| 5,175,672 | 12/1992 | Conner et al. | 361/393 |

FOREIGN PATENT DOCUMENTS

| | | | |
|---|---|---|---|
| 0435343 | 7/1992 | European Pat. Off. | |
| 2264994 | 10/1990 | Japan | 345/905 |
| 3211587 | 9/1991 | Japan | 345/905 |
| 3261989 | 11/1991 | Japan | 345/905 |
| 4196727 | 7/1992 | Japan | 345/905 |

OTHER PUBLICATIONS

*Electronic Packaging and Production*, "Packaging the Computer for Rough Service", vol. 33, No. 9, Sep. 1993, Massachusetts US, pp. 30–32 XP413176, Authored by D. Hoyle.

*Primary Examiner*—Kent Chang
*Attorney, Agent, or Firm*—Paul J. Maginot

[57] ABSTRACT

A display assembly which is positionable substantially adjacent to a printed circuit board within an interior of a computer housing includes a display device positionable within the interior of the computer housing. The display assembly further includes a protective base, secured between the printed circuit board and the display device, wherein the protective base has (1) a display retaining portion and (2) a brace portion, secured to the display retaining portion, for reducing torsional deformation of the display retaining portion.

8 Claims, 3 Drawing Sheets

COMPUTER DISPLAY ASSEMBLY

BACKGROUND OF THE INVENTION

Cross reference is made to co-pending U.S. Pat. applications Ser. No. 08/115,300 (NCR Docket No. 5770), entitled "Apparatus for Containing and Supporting Electronic Devices" by Robert J. Crockett; Ser. No. 08/115,376 (NCR Docket No. 5787), entitled "Computer Housing Seal" by Robert J. Crockett; Ser. No. 08/115,295 (NCR Docket No. 5819), entitled "Isotropic Shock Mounting" by Randal A. Burke; and Ser. No. 29/012,456, entitled "Portable Computer" by Donald Carr, Scott Belliveau and Robert Paterson, all assigned to the same assignee as the present invention, and all filed concurrently herewith.

The present invention relates generally to computers, and more particularly to a display assembly which is positionable within an interior of a computer housing.

There exists numerous designs of display devices which are used in computers. One type of computer which uses a display device is a portable computer. Portable computers are typically transported from a storage site to a remote operating site and then back to the storage site. The mobility of the portable computer exposes it to substantial the risk of damage, especially to the display device used therein. The display device is particularly susceptible to damage since it has low tolerance for torsional deformation (i.e. deformation of the device by twisting or otherwise altering the shape of the device relative to its normal or relaxed state). Torsional deformation of the display device may occur when mechanical force is applied to the housing of the computer, for instance, when a portable computer is inadvertently dropped from a height of a few feet.

It would be desirable to provide a display assembly that is positionable within the interior of a computer housing which has significant resistance to damage from mechanical shock so as to make the display assembly more rugged. It would also be desirable to provide a rugged display assembly which is easy to assemble and inexpensive to manufacture.

SUMMARY OF THE INVENTION

In accordance with one embodiment of the present invention, there is provided a display assembly which is positionable substantially adjacent to a printed circuit board within an interior of a computer housing. The display assembly includes a display device positionable within the interior of the computer housing. The display assembly further includes a protective base, secured between the printed circuit board and the display device, the protective base having (1) a display retaining portion and (2) a brace portion, secured to the display retaining portion, for reducing torsional deformation of the display retaining portion.

Pursuant to another embodiment of the present invention, there is provided a display assembly which is positionable substantially adjacent to a printed circuit board within a computer housing. The display assembly includes a display device positionable within the computer housing. The display assembly further includes a base, secured between the printed circuit board and the display device, the base having a rim portion which is positionable substantially adjacent to a peripheral portion of the display device, the base further having a mechanism for reducing torsional deformation of the rim portion.

In accordance with yet another embodiment of the present invention, there is provided a display assembly adapted to be contained within a computer housing at a location substantially adjacent a printed circuit board. The display assembly includes a display device positionable within the computer housing. The display assembly further includes a base, secured between the printed circuit board and the display device, for supporting the display device and having a rim portion which is positionable substantially adjacent to a portion of the display device which defines the periphery of the display device, wherein the base includes a metallic material.

Pursuant to still another embodiment of the present invention, there is provided a display assembly which is positionable substantially adjacent a printed circuit board within an interior of a portable computer housing. The display assembly includes a display device positionable within the interior of the portable computer housing. The display assembly further includes a metallic tray, interposed between the printed circuit board and the display device, for supporting the display device thereon.

It is a further object of the present invention to provide an improved display assembly.

It is another object of the present invention to provide a display assembly which has significant resistance to damage from mechanical shock so as to make the display assembly more rugged.

It is moreover an object of the present invention to provide a display assembly that includes a protective base which readily dissipates heat generated by electrical components positioned in the proximate vicinity of the protective base.

It is still another object of the present invention to provide a rugged portable computer which is easy to assemble and inexpensive to manufacture.

The above and other objects, features, and advantages of the present invention will become apparent from the following description and the attached drawings.

DETAILED DESCRIPTION OF THE PREFERRED EMBODIMENTS

Figure 1:
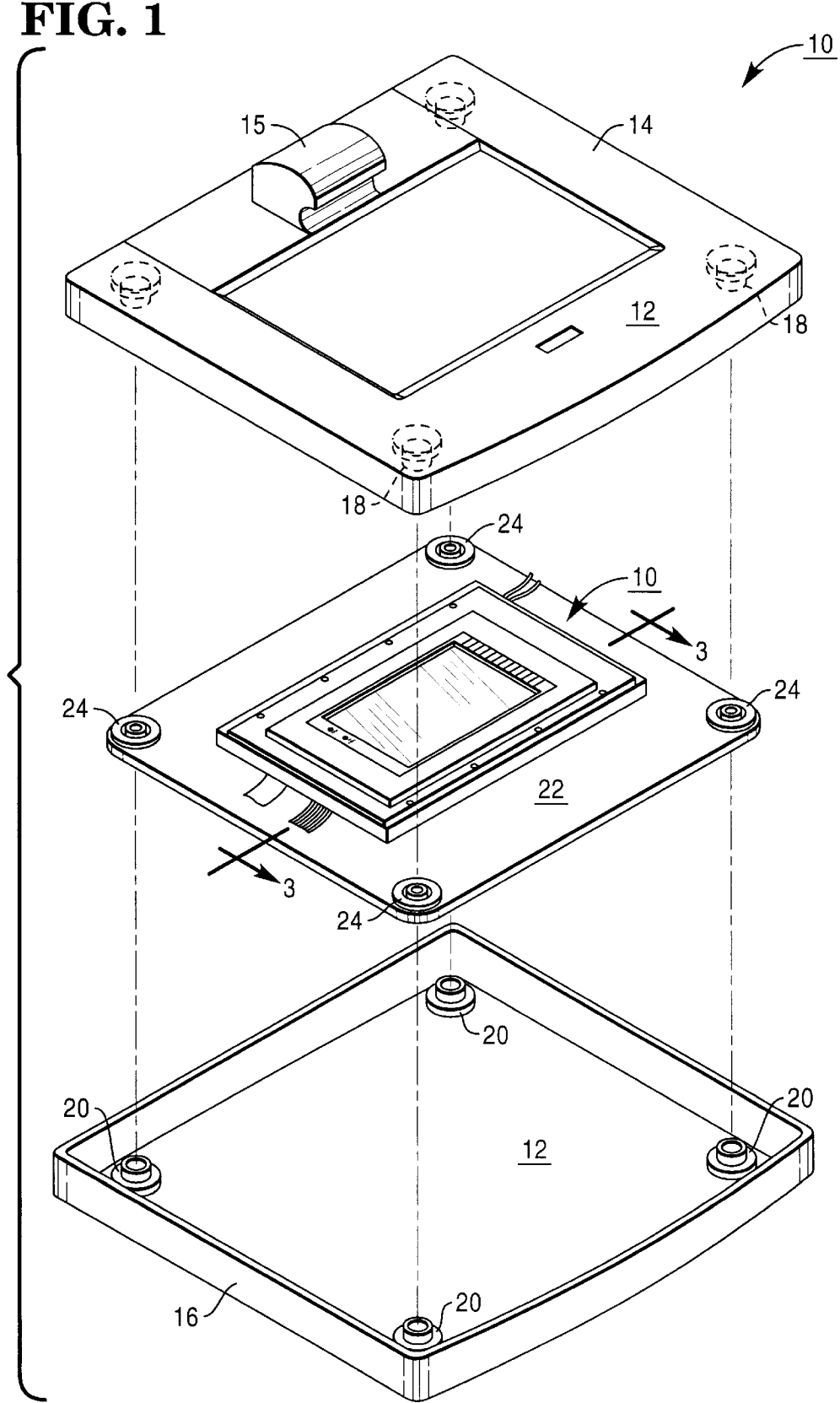
FIG. 1 is an exploded perspective view of the computer housing that contains the display assembly which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a display assembly, generally indicated by the reference numeral 10, which is positionable within the interior of a computer housing 12. The computer housing 12 includes an upper housing portion 14 and a lower housing portion 16. The specific structure of each of the housing portions 14 and 16 is not shown in detail in the FIGS. but may include a substrate with an overmold material positioned over the substrate and secured thereto By way of example, the substrate may be made from a modified nylon material such as Noryl, a trademark of General Electric Company of Fairfield, Conn. Also by way of example, the overmold material may be made of a thermoplastic elastomer such as Krayton, a trademark of Shell Oil Company of Houston, Tex. Defined within the upper housing portion 14 is an opening as shown in FIG. 1. The upper housing portion 14 includes a clip 15 for holding a stylus (not shown) used to input information on the display assembly 10. The upper housing portion 14 further includes a plurality of first support members 18, and the lower housing portion 16 includes a plurality of second support members 20. Each of the first support members 18 extends away from the upper housing portion 14 and terminates at a distal end. A nut (not shown) is friction fit in the interior of each of the first support members 18. Each of the second support members 20 extends away from the lower housing 16 and terminates at a distal end. Moreover, each of the second support members 20 has a central passage defined therein. When the housing portions 14 and 16 are positioned relative to each other so as to contain a printed circuit board 22 and the display assembly 10, the plurality of first support members 18 cooperate with the plurality of second support members 20 so as to secure a plurality of grommets or isolating members 24 within the computer housing 12 and thereby position the display assembly 10 within the computer housing 12. A screw (not shown) extends through the central passage of each of the second support members 20 and meshingly engages the nut positioned within the corresponding first support member 18 so as to secure the upper housing portion to the lower housing portion. The display assembly 10 is supported on and secured to the printed circuit board 22 which has electrical components (not shown) mounted thereon. The protective base 32 is secured to the printed circuit board 22 with a plurality of screws (not shown). The plurality of grommets or isolating members 24 are secured to the printed circuit board 22. Each of grommets 24 are made from an elastomeric material. By way of example, one elastomeric material which may be used is a material available as model no. VL-03 (high impact absorbing material) from EAR Specialty Composite, Inc. of Indianapolis, Ind. Another elastomeric material which may be used is Scotchdamp, a trademark of 3M Corporation of St. Paul, Minn. and available as model no. SJ2015X. When housing portions 14 and 16 are positioned relative to each other so as to contain the printed circuit board 22 therein, the display assembly 10 is accessible through the opening defined in the upper housing portion 14 so that a user can view and input data through such opening.

Figure 2:
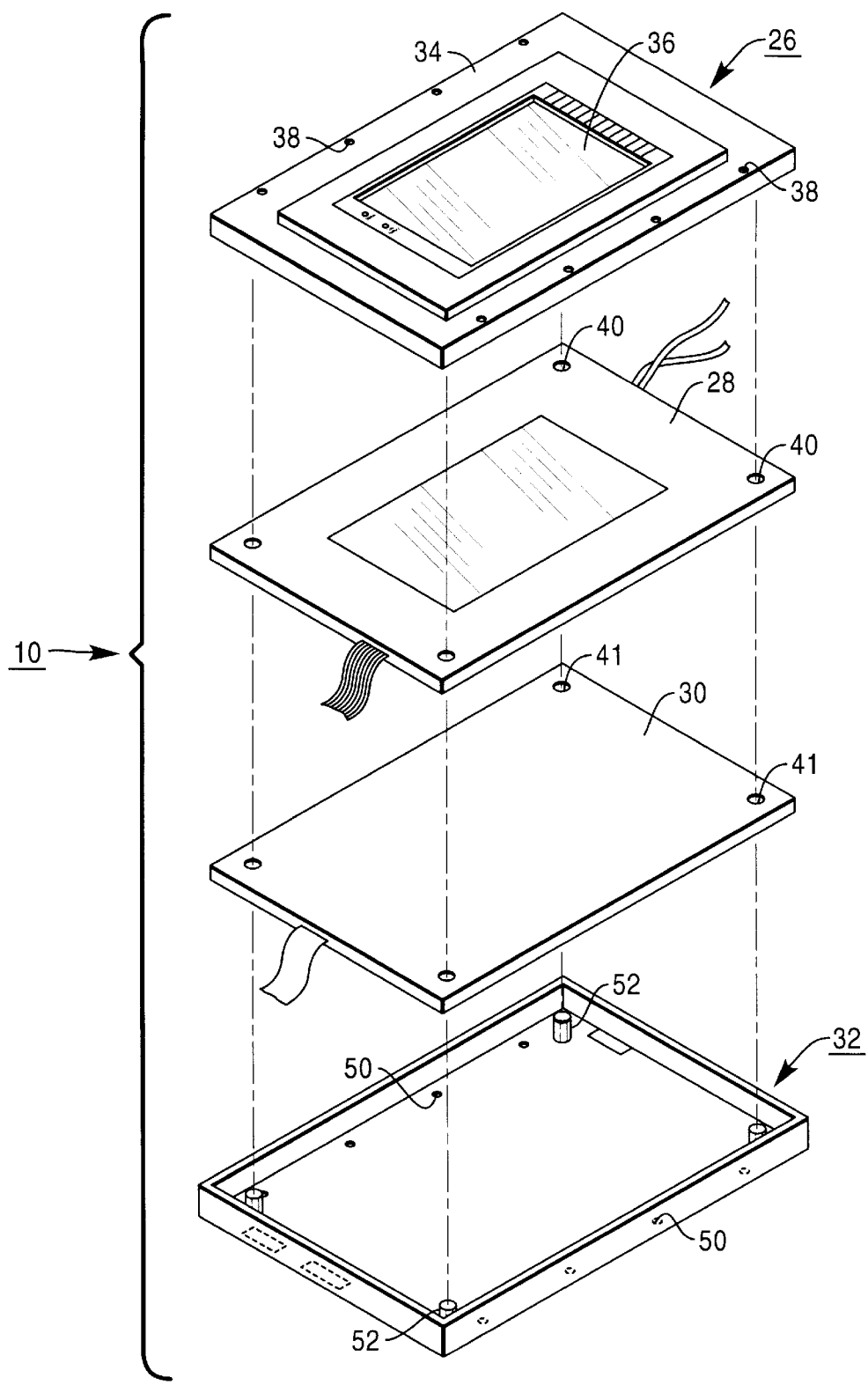
FIG. 2 is an exploded perspective view of the display assembly of FIG. 1.
Figure 3:
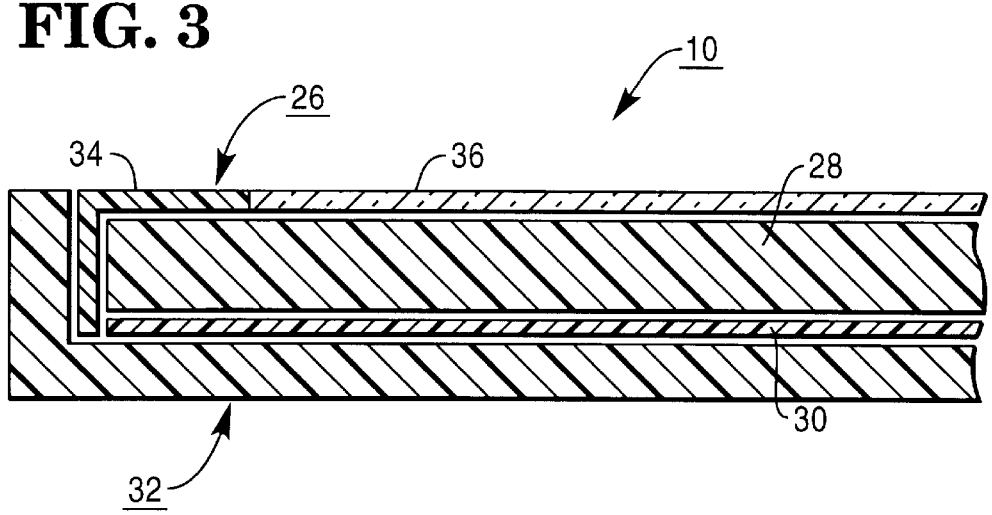
FIG. 3 is a fragmentary sectional elevational view taken in the direction of the arrows 3—3 of FIG. 1.

FIG. 2 shows an exploded perspective view of the display assembly 10. FIG. 3 shows a fragmentary sectional view of the display assembly 10. The display assembly 10 includes a top cover 26, a display device 28, a digitizer input tablet 30 and a protective base or tray 32. The top cover 26 includes a frame portion 34 and a glass portion 36. The glass portion 36 is secured to the frame portion 34 by an adhesive (not shown). A plurality of screw holes 38 are defined in the frame portion 34. The display device 28 possesses a plurality of alignment holes 40 defined therein. The digitizer input tablet 30 also possesses a plurality of alignment holes 41 defined therein.

Figure 4:
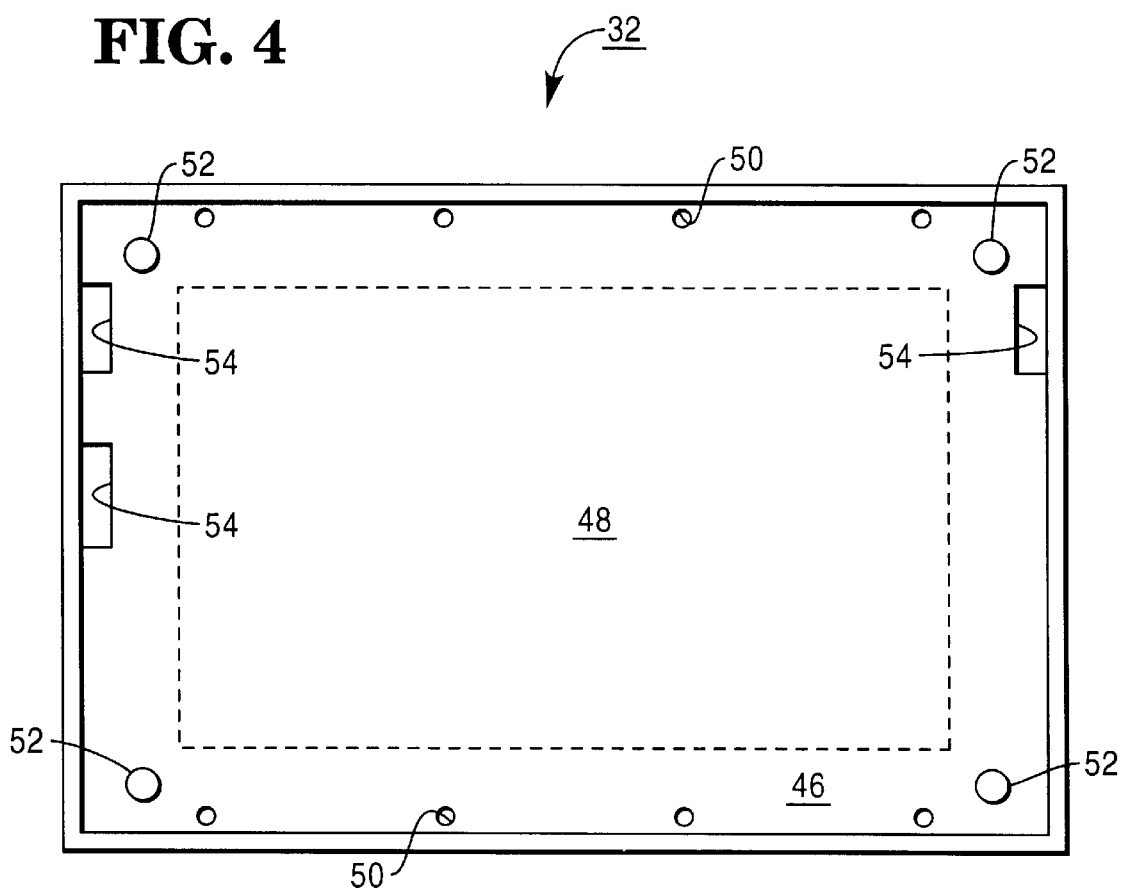
FIG. 4 is a planar view of the protective base of the display assembly of FIG. 1.

Referring now to FIG. 4, there is shown a planar view of the protective base 32. The protective base 32 includes a display retaining portion 46 and a brace portion 48. The brace portion 48 is secured to the display retaining portion 46. More specifically, the brace portion 48 and the display retaining portion 46 are formed as one integral part. The protective base 32 is made of a metallic material. One metallic material which may be used is a magnesium alloy such as the product sold by Aluminum Company of America of Pittsburgh, Pa. as product no. AZ91D. The display retaining portion 46 includes a plurality of screw holes 50 and a plurality of posts 52. A screw (not shown) is positioned in each screw hole 38 of top cover 34 and a corresponding screw hole 50 of protective base 32 so as to secure the top cover to the protective base and thereby retain the display device 28 and the digitizer input tablet 30 therebetween (see also FIG. 3). Each of the posts 52 of the protective base 32 extends through a corresponding alignment hole 41 of the digitizer input tablet 30 and a corresponding alignment hole 40 of the display device 28 so as to align the digitizer input device and the display device within the protective base (see also FIG. 2). The display retaining portion 48 further includes a plurality of apertures 54 through which extends electrical wires of the digitizer input tablet 30 and the display device 28 (see also FIG. 2).

The brace portion 48 functions to support the display retaining portion 46 so as to reduce the amount of torsional deformation of the display retaining portion during the application of mechanical force to the display retaining portion and thereby reduce the amount of torsional deformation of the display device supported on the display retaining portion. Torsionally deforming the display device includes twisting or otherwise altering the shape of the device relative to its normal or relaxed state by application of mechanical force thereto. Mechanical force may be applied to the display retaining portion, and consequently the display device, as a result of inadvertent dropping of the device during its transportation. Moreover, since the protective base 32, including the display retaining portion and the brace portion 48, is made of a metallic material, the protective base functions as a heat sink to more readily dissipate the heat generated by electrical components in the proximate vicinity of the protective base.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. A display assembly which is positionable substantially adjacent to a printed circuit board within an interior of a computer housing, with the printed circuit board having electrical components mounted thereon, comprising:

a display device positionable within the interior of the computer housing, said display device having a rear surface; and a metallic protective base, secured between the printed circuit board and said display device, for supporting the rear surface of said display device, wherein said protective base covers the entire rear surface of the display device so that no portion of the rear surface of said display device is directly exposed to electrical components mounted on the printed circuit board.

2. The assembly of claim 1, wherein said display device is secured to said protective base.

3. The assembly of claim 2, wherein said protective base is secured to the printed circuit board.

4. The assembly of claim 1, wherein said protective base includes a display retaining portion and a brace portion which together define a tray on which said display device is supported.

5. The assembly of claim 4, wherein the tray is positioned substantially adjacent to said display device.

6. A display assembly which is positionable substantially adjacent a printed circuit board within an interior of a portable computer housing, with the printed circuit board having electrical components mounted thereon, comprising:

a display device positionable within the interior of the portable computer housing, said display device having a rear surface; and a metallic tray, interposed between the printed circuit board and said display device, for supporting said display device thereon, wherein said metallic tray covers the entire rear surface of said display device so that no portion of the rear surface of said display device is directly exposed to electrical components mounted on the printed circuit board.

7. The assembly of claim 6, wherein said display device is secured to said metallic tray.

8. The assembly of claim 7, wherein said metallic tray is secured to the printed circuit board.

\* \* \* \* \*